No. 896,852. PATENTED AUG. 25, 1908.
G. H. McKEE.
METHOD AND MOLD FOR MAKING HOLLOW WARE.
APPLICATION FILED APR. 17, 1907.
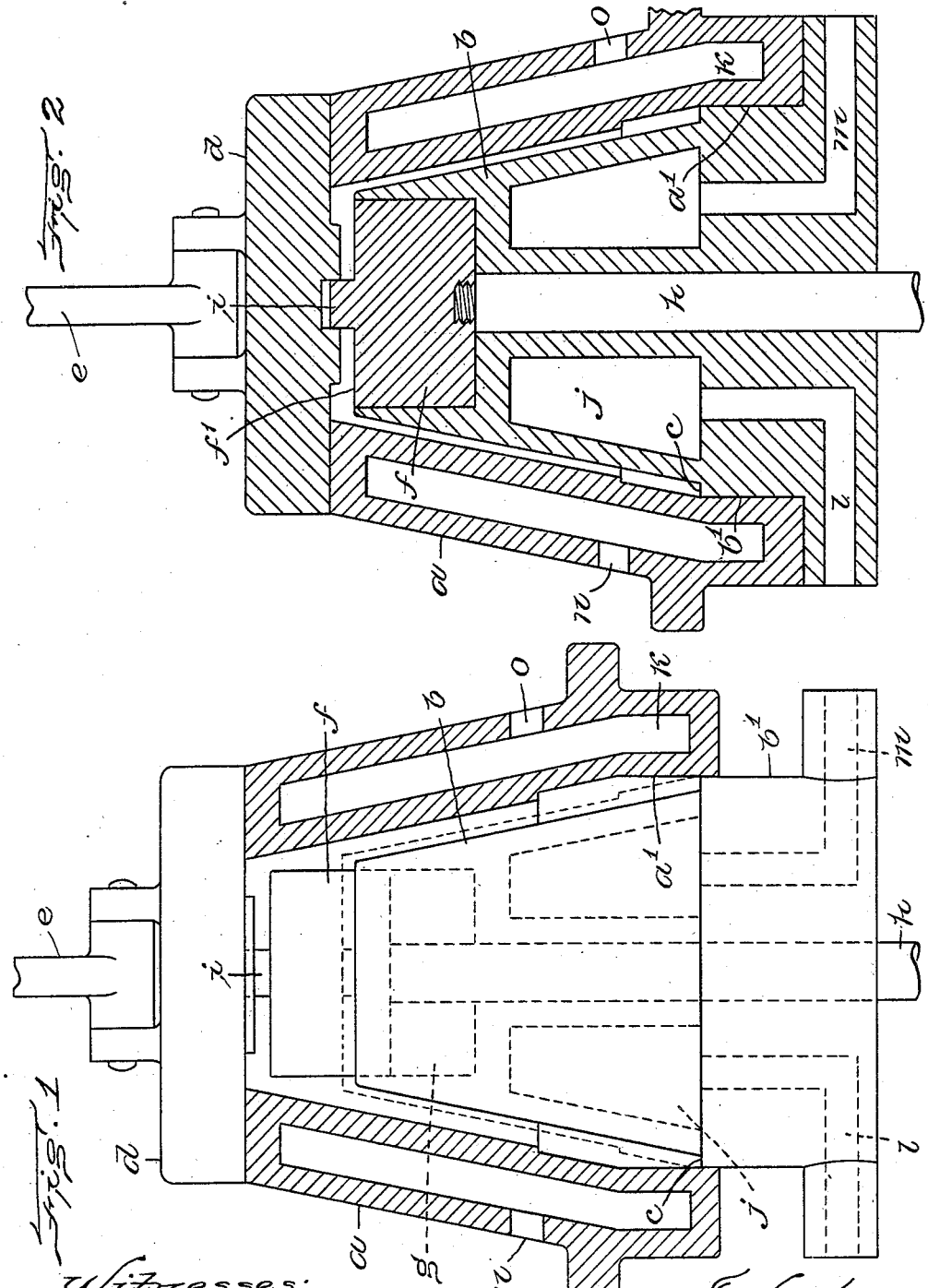
Witnesses:
A. C. Ratigan
J. F. Richardson
Inventor
George H. McKee
by Bakewell Brown Bundy & Bakewell
Attorneys

UNITED STATES PATENT OFFICE.

GEORGE H. McKEE, OF CAMBRIDGE, MASSACHUSETTS.

METHOD AND MOLD FOR MAKING HOLLOW WARE.

No. 896,852.	Specification of Letters Patent.	Patented Aug. 25, 1908.

Application filed April 17, 1907. Serial No. 368,616.

*To all whom it may concern:*

Be it known that I, GEORGE H. McKEE, of Cambridge, in the county of Middlesex and State of Massachusetts, have invented certain new and useful Improvements in Methods and Molds for Making Hollow Ware, of which the following is a specification.

The present invention relates to the art of molding hollow ware from clay, having particular reference to that class of articles typified by flower-pots, which are open at the top, closed at the bottom, and have longitudinal sides either perpendicular or inclined with respect to the bottom, and with straight or curved elements.

The particular object of the invention is to enable articles of this sort to be molded from dry clay.

Hitherto flower-pots and like articles have been universally made from wet clay, which is placed in a mold and forced into the required shape by the insertion of a core or shaping tool arranged and operated so as to cause the clay to flow up the sides of the mold between the shaper and the mold until the required final form is attained. Articles so made must be dried before baking and are exceedingly liable to become warped and cracked during the drying process. On the other hand, articles made from dry clay may be baked as soon as molded without necessitating any loss of time in preliminary drying and without being liable to any danger of warping and cracking. Flower-pots in particular when made from dry clay are superior to those made from wet clay because they have a smoother surface, and are more porous when baked. Up to the present time, however, it has been impossible to make flower-pots and other hollow ware articles from dry clay and have them strong enough to withstand the handling necessary in transferring them to the kilns for baking.

It is the object of the present invention to provide a mold by which the dry clay can be fashioned into the required form, and at the same time compressed uniformly throughout with sufficient force to give the necessary compactness, so that a firm, strong and homogeneous article may be produced which will stand a considerable amount of rough handling before being baked. I attain this object by the mold which is illustrated in the drawings and hereinafter described and claimed.

Of the accompanying drawings,—Figure 1 represents the mold embodying my invention, part of the mold being in section to show the internal members thereof in elevation. Fig. 2 represents a vertical section of the mold when in position to compress the material within the smallest compass.

The same reference characters indicate the same parts in both figures.

Referring to the drawings, it will be seen that the mold is composed essentially of two parts, an outer member or mold *a* and an inner member or core *b*. The core has the configuration externally of the interior of the article to be shaped, while the interior of the mold *a* is shaped according to the external form of the article. The core has a wide base by which it is supported in a press of any suitable character, and is provided adjacent its base with vertical sides *b'* which serve as a bearing for the mold *a*. This member, as shown in the drawings, has straight internal walls *a'* at its base and has no bottom, being adapted to pass over the core and to fit with a close sliding fit against the bearing surface *b'*. There is thus given provision for a relative longitudinal movement between the core and outer member, which can be made as great or as slight as desired by suitably proportioning the lengths of the surfaces *a'* and *b'*. These surfaces fit so closely together as to prevent any appreciable quantity of clay being forced between them.

It will be noted that the mold is inverted and that the outer member *a* is open at the upper end, where the bottom of the pot or similar article is formed, such upper end being the inverted open bottom of the mold. The actual bottom is formed by the annular shoulder *c* which extends around the core *b* above the bearing surface *b'*, shaping the top edge or rim of the article, and is made of sufficient lateral extent to provide the necessary space between the upper walls of the core and the inner walls of the mold to receive the molded article.

Before forming an article the members are relatively extended, as shown in Fig. 1, to give the required length to the space for receiving the clay so that the latter may be sufficiently compressed by a longitudinal contracting movement of the members relatively to each other. The clay is then placed into the mold to the level of the top thereof, and is pressed down by a die *d* which bears against the member *a* and covers the opening thereof, while the inner member is forced upward. This top die is operated by any suitable power mechanism which may include a toggle linkage, one member of which is shown at $e$.

In order to permit an equal compression of the sides of the article with that of the bottom, I make the core so that it can be lengthened and shortened simultaneously with the relative movement of the members. This constitutes the essential feature of the invention by which the objects above outlined are attained.

The elongation and contraction of the core is produced by movement of an extension core member or plug $f$ which is contained in a recess $g$ of the core and can move telescopically into and out of such recess, or remain stationary while the core body moves, thus producing the same effect. When fully retracted, the upper surface $f''$ of the extension is flush with the end of the main part of the core. It is made of so great a length that it can project by the same amount as the relative travel of the mold members. A rod $h$ which passes through the axis of the core is threaded at its upper end into the extension piece and serves as the means by which the latter is projected and retracted. When the molds are adapted to shape articles such as flower-pots which have holes in their bottoms, the extension piece has a projection $i$ which is surrounded by the layer of clay placed on the top of the core and enters a recess in the die when the die is pressed down. This projection has a length equal to the thickness of the finished article at its bottom plus the amount of compression which must be given to the clay.

Before the mold is filled the extension piece is projected until its surface $f'$ is separated from the lower surface of the die $d$ by a distance equal to the length of the projection $i$, that is, such that the end of this projection is flush with the top of the mold. Upon pressure being applied to the die, the outer mold is slightly lowered and the extension piece is brought downward simultaneously therewith, and the core is raised by other pressure mechanism, not shown, which is caused to exert force to the necessary degree, resulting in applying a force of thirty tons or more, according to the size of the article to be formed. This compresses the clay to a fraction of the bulk which it had when in the former dried and pulverized state, and causes the particles to be wedged so tightly together that they will remain firm after removal of the mold, and even when struck a sharp and sudden blow.

To render possible the removal of the molded articles, the members of the mold are heated by steam blown into the annular heating chambers $j$ and $k$ of the core and outer mold respectively. The former has passages $l$ and $m$ opening into it, of which one forms the inlet and the other the outlet, while in the outer member are openings $n$ and $o$ serving the same purpose.

Without the extension core used in the manner described, it would be impossible to use dry clay in the manufacture of hollow articles. This is true for the reason that, if the core were not extensible and only enough clay were placed on its top surface to make the bottom of the article, there would not be a deep enough space at the sides of the mold to receive sufficient clay to make the sides of the article with the necessary compactness; accordingly, though the bottom might be perfect, the sides would be loose and would fall away. On the other hand, if the mold were filled to the height necessary to provide enough material for the formation of sides having the required density, the core being necessarily covered to a correspondingly greater depth, the bottom of the article would be too thick, and, becoming compact, would stop the motion of the die before the sides had been compressed to the required degree. A substance like pulverized dry clay does not flow or transmit pressure equally in all directions but packs and arches locally so as to resist the motion of the pressure means and to permit portions which are not directly acted upon by the pressure means to remain in a loose state, while other portions of the mass are firmly packed together and made hard. It is well known that a thick article cannot be satisfactorily pressed from dry clay by simply forcing a plunger or die into a box-like mold, but that it is necessary to produce the pressure by moving dies at opposite sides or ends of the article, each of which moves relatively to the sides of the containing mold. Where the pressure is produced only by one die, the clay acted upon directly by the latter is firmly compressed, but that near the stationary end or bottom of the mold is only loosely compressed and is liable to crumble away when handled. This effect is due to the fact that the clay forms arches or domes which bear practically all of the pressure while the particles contained below the elements of the arches or domes are not acted upon to any great extent and so may crumble away when the confining walls of the mold are removed. When there is a relative motion between the compressing plunger and the walls of the mold, the arches adjacent the outer surface of the clay mass are broken up and the clay particles constantly dislodged and caused to pack closely together throughout the entire mass until there is practically a uniform pressure and density throughout. This is especially true when articles are made having long sides practically perpendicular to their bases. If these articles are pressed by a plunger entering one end of a long mold, the portions adjacent the other end of the mold are left loose. Where the whole outer portion of the mold moves relatively to the inner portion, the surfaces forming the sides of the article move relatively to each other and so continually act to roll the particles of clay over and over and so break up the pressure-resisting arches. This action takes place with molds constructed in accordance with my invention, and is permitted by reason of the telescopic contraction of the core. As the core is extended when the mold is filled, the form of the space for receiving the clay is the same as that of the finished article, while the proportional thickness of material over the end of the core with respect to the length of the side walls is also the same. The contraction of the core enables the whole mass of material carried on its upper surface to be moved bodily downward without greater proportional compression than is given the sides, and so permits as great a motion of one member of the mold relatively to the other as is necessary to give the sides of the article the necessary compactness, and as much as is permitted by the clay itself. The outer member throughout its whole extent slides upon and rolls the clay particles into close contact, and thereby causes the pressure to be distributed uniformly throughout the whole length of the sides of the article. Thus the sides are uniformly pressed and given as great a compression and proportional contraction as is produced upon the bottom of the article.

With conical molds such as illustrated herein, a lateral component of pressure is given to the article by reason of the fact that the inclination of the mold causes the sides of the outer member to approach the core, but even without the lateral pressure so given, the movement of the members may be made great enough to compress the sides of a vertical article by direct longitudinal pressure alone.

By comparing Figs. 1 and 2, it will be seen that the sides of the telescopic or extension core are practically continuous when extended, the member or plug $f$ being of substantially the same diameter as that of the upper end of the main inner core $b$. In practice, the inner or extensible core is formed with as small a jog or shoulder as possible so that there will be no obstruction to the downward movement of the material being operated upon when the mold is being collapsed. During the molding operation the sides of the extension portion $f$ of the core co-act with the inner side walls of the outer member of the mold to form portions of the sides of the article during the first part of the molding operation.

It will also be seen that the spaces between the sides of the inner and outer members is of a form similar to that of the sides of the article to be molded, but of greater length; and that the space at the top which connects with the side spaces corresponds to the end of the article. Therefore, when said spaces are filled with dry pulverized clay and when the side space is shortened and the end space contracted, the amount of such shortening of the side spaces and contraction of the end space are unequal, but of approximate proportion to the respective depths of said spaces, whereby all portions of the clay are made equally compact.

I claim:—

1. A mold for making hollow-ware articles out of dry clay, comprising inner and outer members separated by an intermediate space which surrounds the inner member; said space being adapted to be filled with, and the upper end of the inner member adapted to support a layer of dry, pulverized clay to form respectively the sides and end of an article, the members being relatively movable longitudinally and the inner member contractible so as to shorten and compress the sides of the article.

2. A mold for making hollow-ware articles from dry powdered clay, comprising an inner member arranged to support on its upper end the clay to form the bottom of the article, and an outer member inclosing a space on all sides of the inner member to receive clay in a pulverized dry state to form the sides of the articles, said members being relatively movable longitudinally and the inner member being contractible so as to permit shortening of the space containing, and compression of, the material to form the sides of the article.

3. A mold for shaping hollow ware, comprising an extensible core the sides of which are practically continuous when extended, and an outer mold open at the top and surrounding said core, closely fitting the latter at its lower end, being movable endwise with respect to the latter.

4. A mold for shaping hollow ware, comprising a core variable in length and the sides of which are practically continuous when extended, and an external mold adapted to surround said core and inclose a space on all sides of the latter, said external mold and core being relatively longitudinally movable, and the core being contractible simultaneously with such movement to diminish the length of the inclosed space.

5. A mold for hollow ware having an extension core the sides of which are practically continuous when extended.

6. In a mold for making hollow-ware articles, a telescopic core, of which the adjacent parts of the relatively extensible portions are of approximately the same diameter.

7. A telescopic extensible and contractible core for hollow-ware-shaping molds the sides of said core being practically continuous when extended.

8. A mold adapted to shape and compress hollow-ware from dry clay, comprising a core having the conformation externally of the interior of the article to be molded and having a straight bearing surface at its base, an extension to said core relatively movable to vary the length thereof, and an inverted external mold open at the upper end, inclosing a space outside of the core, and fitting closely about the bearing surface of the core, whereon a limited relative sliding movement is permitted.

9. A mold adapted to shape and compress hollow-ware from dry clay, comprising a core having the conformation externally of the interior of the article to be molded and having a straight bearing surface at its base and a recess in its upper end, a plug or extension piece fitting in said recess and adapted to be projected therefrom to increase the length of the core as a whole, and an external member fitting slidingly upon the said bearing surface and open at the upper end, said plug and external member being movable relatively to the core to increase and diminish the height of the molding space between the core and the external member.

10. A mold adapted to shape and compress hollow ware from dry clay, comprising a core having the conformation externally of the interior of the article to be molded and having a straight bearing surface at its base, an extension to said core relatively movable to vary the length thereof, and an external mold open at the upper end, inclosing a space outside of the core, and fitting closely about the bearing surface of the core, whereon a limited relative sliding movement is permitted, said core and external mold having interior heating chambers.

11. A mold adapted to shape and compress hollow-ware from dry clay, comprising a core having the conformation externally of the interior of the article to be molded and having a straight bearing surface at its base, an extension to said core relatively movable to vary the length thereof, and an external mold open at the upper end, inclosing a space outside of the core, and fitting closely about the bearing surface of the core, whereon a limited relative sliding movement is permitted, said core and external mold being recessed to provide heating chambers and inlet and outlet openings thereto.

12. A mold adapted to shape and compress hollow-ware from dry clay, comprising a core having the conformation externally of the interior of the article to be molded and having a straight bearing surface at its base and a recess in its upper end, a plug or extension piece fitting in said recess and adapted to be projected therefrom to increase the length of the core as a whole, a rod passing through the core and connected to said extension piece, whereby the latter can be projected and withdrawn, and an external member fitting slidingly upon the said bearing surface and open at the upper end, said plug and external member being movable to increase and diminish the height of the molding space between the core and the external member.

13. A mold for hollow-ware comprising an outer and an inner member inclosing a space between them, and fitting closely together at one end with a sliding fit, permitting relative movement, the inner member being substantially co-extensive with the outer member, and being collapsible during the relative movement of the members, whereby the material to form the sides of the article molded may be sufficiently compressed from both ends.

14. A mold for hollow-ware comprising an outer and an inner member inclosing a space between them, and fitting closely together at one end with a sliding fit, permitting relative movement, the outer member being open at the upper end and the inner member terminating sufficiently far from the top of said outer member to receive material for the end of the article to be molded, said members having a relatively longitudinal movement to shorten the space between them, and the inner member being simultaneously contractible in length, whereby the sides of the article may be compacted equally with the end thereof.

15. A mold having a space to receive dry pulverized clay in the form of the finished article, the mold being contractible to permit equal proportional compression of all parts of the clay, and the inner member or core being so shaped that the clay can be carried downward along its sides during compression.

16. A mold consisting of an outer member open at the top and an inner member projecting through the bottom of the outer member with a tight sliding fit, the said members inclosing a space adapted to receive dry powdered clay in the form of the finished article but of greater volume, said inner member being contractible to permit equal proportional compression of the clay forming the end and sides of the article, the sides of said inner member being practically continuous when extended.

17. The method of making hollow-ware articles, which consists in providing a space of a form similar to that of the sides of the articles to be molded, but of greater length, and a transverse connected space corresponding to the end of the article, entirely filling both such spaces with dry pulverized clay, and simultaneously shortening the side space and contracting the end space by amounts which are unequal and approximately proportional to the relative depths of said spaces, whereby the clay in all parts of the article is made equally compact.

18. The method of making hollow-ware articles from dry clay, which consists in providing an annular space, closed at the lower end and open at the top, in the general form of the sides of the article to be molded but of greater length, filling such space with dry powdered clay, placing a transverse layer of the same material entirely across the area defined by the top of such annular space covering such layer, and contracting the spaces containing the clay longitudinally by unequal amounts proportional to the relative depths of said annular space and transverse layer, whereby all parts of the clay confined therein are equally compacted.

19. The method of making hollow-ware articles from dry powdered clay, which consists in providing an inverted mold having merging spaces closed at the bottom to receive the material for the sides of the article and of greater depth than the finished article, filling such spaces from the top and placing a transverse layer of the clay entirely across the top of the mold, covering such transverse layer, and shortening the side spaces of the mold to compact the material therein, while retaining the transverse layer in connection with such material the shortening of the side spaces considerably exceeding the contraction of the transverse layer.

In testimony whereof I have affixed my signature, in presence of two witnesses.

GEORGE H. McKEE.

Witnesses:
A. C. RATIGAN,
ARTHUR H. BROWN.